United States Patent [19]

Chang

[11] 4,342,502
[45] Aug. 3, 1982

[54] TRANSVERSE TUNABLE ACOUSTO-OPTIC FILTER

[75] Inventor: I-Cheng Chang, Sunnyvale, Calif.

[73] Assignee: Itek Corporation, Lexington, Mass.

[21] Appl. No.: 158,662

[22] Filed: Jun. 12, 1980

[51] Int. Cl.³ .............................................. G02F 1/33
[52] U.S. Cl. .................................. 350/358; 350/372; 350/373
[58] Field of Search .................... 350/358, 372, 373

[56] References Cited

U.S. PATENT DOCUMENTS

| 4,052,121 | 10/1977 | Chang | 350/358 |
| 4,232,952 | 11/1980 | Barta | 350/358 |
| 4,257,685 | 3/1981 | Barta | 350/358 |

OTHER PUBLICATIONS

Yano et al., "New Noncollinear Acousto-optic Tunable Filter Using Birefringence in Paratellurite", *Applied Physics Letters*, vol. 24, No. 6 (Mar. 15 1974), pp. 256–257.

Chang, "Noncollinear Acousto-optic Filter with Large Angular Aperture", *Applied Physics Letters*, vol. 25, No. 7 (Oct. 1 1974), pp. 370–372.

Chang, "Analysis of the Noncollinear Acousto-optic Filter", *Electronics Letters*, vol. 11, Nos. 25/26, (Dec. 11 1975), pp. 617–618.

*Primary Examiner*—R. A. Rosenberger
*Attorney, Agent, or Firm*—Homer O. Blair; Robert L. Nathans; Gerald H. Glanzman

[57] ABSTRACT

An electronically tunable optical filter utilizing noncollinear acousto-optic interaction in a birefringent crystal. The directions of optical and acoustic waves are chosen so that large angular aperture is obtained for an interaction geometry wherein the light beam is perpendicular to the group velocity of the acoustic wave. The transverse configuration provides maximum optical aperture for the tunable acousto-optic filter.

5 Claims, 4 Drawing Figures

TRANSVERSE TUNABLE ACOUSTO-OPTIC FILTER

DESCRIPTION

TECHNICAL FIELD

The present invention relates to the field of electronically tunable optical filters utilizing noncollinear acousto-optic interaction in a birefringent crystal.

BACKGROUND ART

Electronically tunable acousto-optic bandpass filters have been constructed so that a cone of light of first polarization is diffracted by an acoustic wave in an anisotropic medium (such as a birefringent crystal) to shift the light beam from the first to a second polarization at a selected bandpass of optical frequencies. The center wavelength of the passband of the acousto-optic filter is electronically tunable by changing the frequency of the acoustic wave within the crystal.

Two basic types of tunable acousto-optic filters have been constructed: collinear and noncollinear. In the collinear filter, the incident and diffracted light beams inside the birefringent crystal are collinear with the acoustic beam. The diffracted light beam at the selected passband is separated from the incident light beam by crossed polarizers. The collinear type of acousto-optic filter is disclosed in an article entitled "Acousto-Optic Tunable Filters" appearing on pages 744–747 in the June, 1969 issue of The *Journal of the Optical Society of America* (Vol. 59, No. 6), and in U.S. Pat. No. 3,679,288, entitled "Tunable Acousto-Optic Method and Apparatus."

In the noncollinear filter, the light beams inside the birefringent crystal are noncollinear with the acoustic beam. The diffracted light beam at the passband is separated from the incident light beam by either crossed polarizers or spatial separations. The noncollinear type of acousto-optic filter is disclosed in an article entitled "Noncollinear Acousto-Optic Filter with Large Angular Aperture," appearing on pages 370–372 of the Oct. 15, 1974 issue of the *Applied Physics Letters* (Vol. 25), and in U.S. Pat. No. 4,052,121, entitled "Noncollinear Tunable Acousto-Optic Filter."

The most significant feature of both the collinear and noncollinear tunable acousto-optic filter is that a narrow filter bandpass can be maintained for a relatively large cone of incident light. This large angular aperture characteristic is due to the proper choice of acousto-optic interaction geometry, wherein the tangents to the locus of the incident and diffracted light wave vectors are parallel. This condition of "parallel tangents" applies to both noncollinear and collinear acousto-optic filters.

For the remainder of this disclosure, "tunable acousto-optic filter" will be defined as an optical filter that operates on the basis of the "parallel tangents" type of acousto-optic diffraction in a anisotropic medium wherein the "parallel tangents" condition is satisfied. This type of tunable acousto-optic filter is clearly distinguishable from the type with small angular aperture as disclosed in U.S. Pat. Nos. 3,944,334; 3,944,335 and 3,953,107, all of which are entitled "Acousto-Optic Filters."

DISCLOSURE OF THE INVENTION

In the present invention, it has been discovered that for certain crystals it may be possible to choose a preferred configuration or interaction geometry in a noncollinear tunable acousto-optic filter. Specifically, the present invention describes a transverse configuration in which the optical beam is perpendicular to the acoustic beam, i.e., group velocity of the acoustic wave. The present invention provides the design equation of the crystalline orientations required for the preferred transverse configuration.

One feature of the present invention is that the transverse configuration provides an extended acoustic path so that a large optical aperture can be realized for an acousto-optic filter with no increase of drive power. Another feature of the present invention is that the transverse configuration optimizes the ratio of active area of the acousto-optic filter to the crystal size. Another feature of the present invention is that the transverse configuration minimizes optical aberrations when the tunable acousto-optic filter is used for optical imaging applications.

BRIEF DESCRIPTION OF THE DRAWINGS

FIG. 8 is a wavevector diagram for acousto-optic interaction in a noncollinear acousto-optic filter. The FIG. shows that the magnitude and direction of the acoustic wavevector must be so chosen that the tangents to the optical wavevector loci are parallel.

BEST MODE FOR CARRYING OUT THE INVENTION

Figure 1:
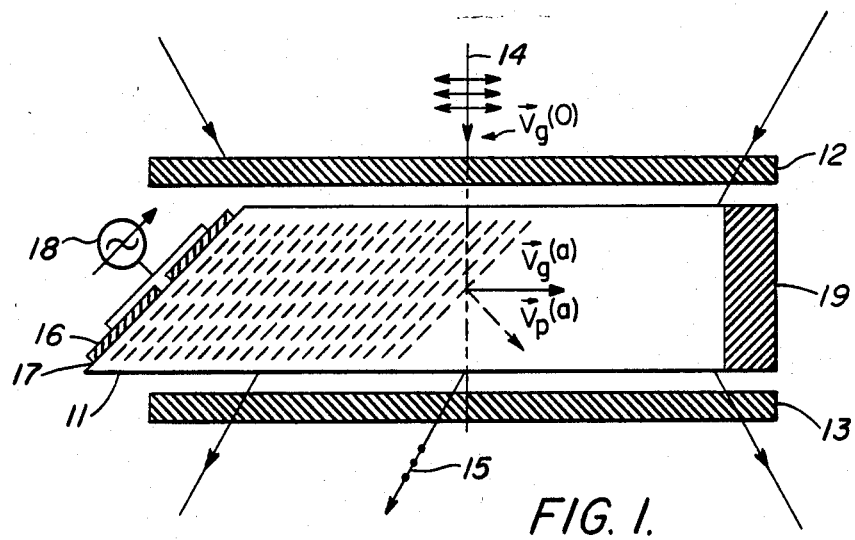
FIG. 1 is a schematic representation of a transverse tunable acousto-optic filter construction in accordance with the present invention.

Referring to FIG. 1, a configuration of the transverse tunable acousto-optic filter of the present invention is shown diagrammatically. The filter comprises a suitable optical anisotropic medium such as a birefringent crystal 11, an input polarizer 12, and an output analyzer 13. The input cone of light beam 14 is polarized by the input polarizer 12, enters the medium 11, propagates along a predetermined axis of the birefringent crystal, passes out the opposite face of medium 11 as the output 15, and then passes through the output analyzer 13.

One or more acoustical transducers 16 (two transducers are shown in the FIG.) are mounted in intimate contact with the crystal 11 on a predetermined surface 17 and are connected to a suitable generator or source 18, such as a voltage controlled oscillator, the frequency and amplitude of which can be varied. The acoustic wave generated at the transducer is launched into the crystal 11 and absorbed by the acoustic termination 19. The wave normal of the generated acoustic wave is along the acoustic phase velocity $\vec{V}_p^{(a)}$, (which is the same direction as the acoustic wavevector $\vec{k}_a$) and the energy flow of the acoustic wave is along the group velocity $\vec{V}_g^{(a)}$. For acoustically anisotropic mode, $\vec{V}_p^{(a)}$ and $\vec{V}_g^{(a)}$ are generally noncollinear. The acoustic phase velocity direction $\vec{V}_p^{(a)}$ is chosen in such a way so that the tangents to the locus of the incident and diffracted light wavevectors are parallel ("parallel tangents condition"). The acoustic group velocity direction $\vec{V}_g^{(a)}$ is chosen to be perpendicular to the optical beam direction (transverse configuration). The direction of the optical beam (or ray) in a birefringent crystal coincides with that of the ordinary polarized optical wavevector.

Figure 2:
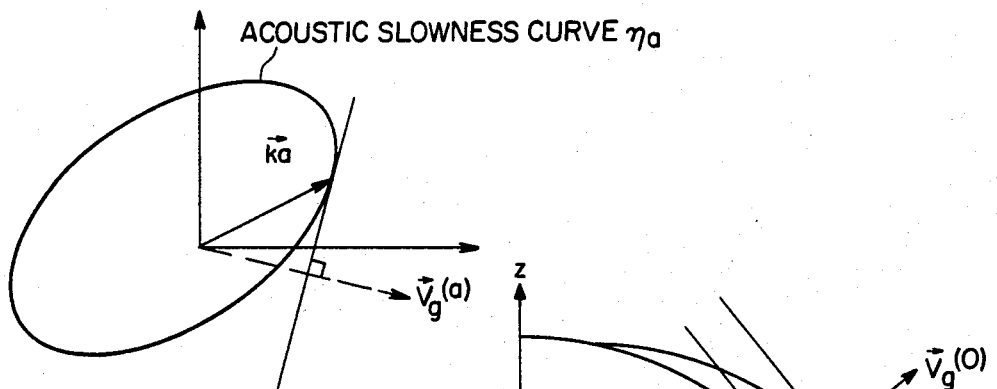
FIG. 2 is a diagram of the acoustic wave vector locus (slowness curve). The FIG. shows that the group velocity $\vec{V}_g^{(a)}$ is always normal to the slowness curve.

The geometrical meaning of the chosen preferred acousto-optic interaction geometry is best illustrated by the diagrams of wavevector construction. FIG. 2 shows the slowness curve of the locus of the acoustic wavevector, $\vec{k}_a$, in an acoustically anisotropic crystal. The acoustic wave phase velocity $\vec{V}_p^{(a)}$ is along the direction of the acoustic wavevector $\vec{k}_a$. The acoustic wave group velocity $\vec{V}_g^{(a)}$ is normal to the slowness curve (i.e., perpendicular to the tangent) for acoustically anisotropic crystals, $\vec{V}_g^{(a)}$ is noncollinear with $\vec{V}_p^{(a)}$.

Figure 3:
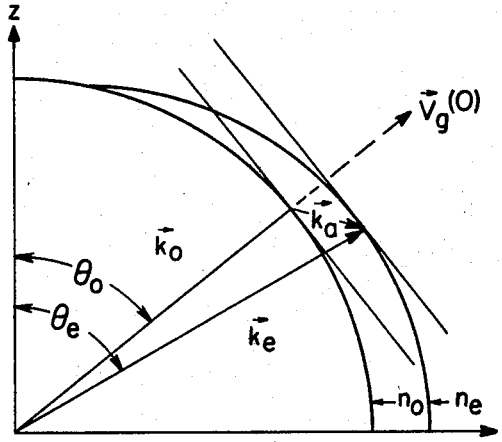

FIG. 3 shows the diagram of wavevectors $\vec{k}_e$, $\vec{k}_o$, and $\vec{k}_a$; where $\vec{k}_e$ is the (incident) extraordinary polarized optical wavevector, $\vec{k}_o$ is the (diffracted) ordinary polarized optical wavevector, and $\vec{k}_a$ is the acoustic wavevector. Notice that the tangents to the locus of $\vec{k}_e$ and $\vec{k}_o$ are chosen to be parallel. The "parallel tangents" condition allows the wavevectors $\vec{k}_e$ and $\vec{k}_o$ to be rocked together for small deviation of incident light direction; and as such, a large angular aperture is realized. Since the optical ray direction (i.e., the direction of the optical wave group velocity, $\vec{V}_g^{(O)}$) is normal to the locus of optical wavevector, the condition of parallel tangents is equivalent to the statement that the optical rays for the incident and diffracted light are collinear.

Figure 4:
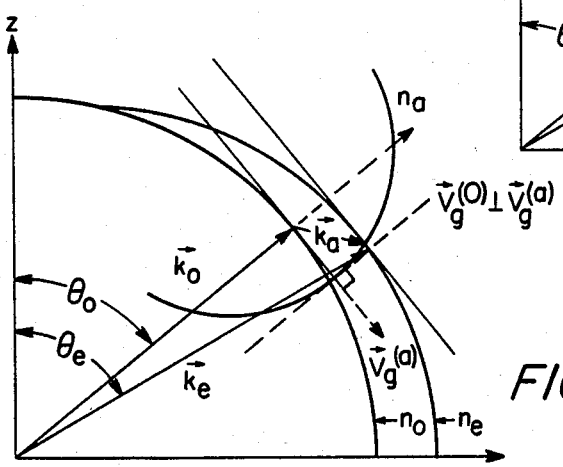
FIG. 4 shows the relationshop of optical and acoustic wavevectors and rays in a transverse acousto-optic filter.

For some crystals it is possible to satisfy the "parallel tangents" condition in a transverse interaction geometry. FIG. 4 is a superposition of FIGS. 2 and 3. It shows the diagram of wavevectors and rays for the optical and acoustic waves. The operating point is properly chosen so that the optical group velocity $\vec{V}_g^{(O)}$ is perpendicular to the acoustic group velocity $\vec{V}_g^{(a)}$.

The operating point (i.e., directions of optical and acoustic wavevectors) of transverse tunable acousto-optic filter can be determined based on geometrical construction as shown in FIG. 4. For certain classes of crystals analytic solutions are possible. For instance, in a trigonal crystal there exists a pure shear mode polarized along the x-axis. The directions of the acoustic phase velocity ($\theta_a$) and acoustic group velocity ($\theta_g$) are related by $$\tan \theta_a = \frac{C_{14} - C_{44} \tan\theta_g}{C_{14} \tan\theta_g - C_{66}} \qquad (1)$$

the condition of "parallel tangents" yields, $$\tan \theta_o \tan (\theta_a - \theta_o) = 2 \qquad (2)$$

where $\theta_o$ is the incident angle of the ordinary wavevector. Derivation of Eq. (2) was given in an article entitled "Analysis of the Noncollinear Acousto-Optic Filter," appearing in the Dec. 11, 1975 issue of the *Electronics Letters* (Vol. 11, Nos. 25/26).

The condition of transverse geometry (i.e., $\vec{V}_g^{(o)}$ perpendicular to $\vec{V}_g^{(a)}$) gives $$\tan \theta_g \tan \theta_o = -1 \qquad (3)$$

Eqs. (1)–(3) give the following cubic equation in t, where $t = \tan \theta_o$ $$t^3 + \left(2 - \frac{C_{44}}{C_{66}}\right) t + 2 \frac{C_{14}}{C_{66}} = 0 \qquad (4)$$

Since there exists at least one real root for a cubic equation, it is always possible to find a crystal orientation such that the conditions of "parallel tangents" and transverse interaction can be simultaneously satisfied.

Consider, for example, the use of crystal quartz as the filter medium in which the selected axis of the light beam lies in the (100) plane and $C_{44} = 5.794 \times 10^{10}$ N/m², $C_{66} = 3.987 \times 10^{10}$ N/m² and $C_{14} = -1.791 \times 10^{10}$ N/m². Using these elastic constants, Eq. (4) can be solved to give $\theta_o \approx 37.9°$.

Another crystal that is suitable as a transverse tunable acousto-optic filter is Tl₃AsSe₃. This crystal is optically transpatent from 1.2-17 microns and is therefore useful for the infrared region. The selected axis of the light beam lies in the (100) plane and the elastic constants of Tl₃AsSe₃ are: $C_{44} = 8 \times 10^9$ N/m², $C_{66} = 8.6 \times 10^9$ N/m², and $C_{14} = -1.3 \times 10^9$ N/m². Using these values, Eq. (4) can be solved to give $\theta_o \approx 15°$.

Eq. (4) is also applicable for tetragonal and hexagonal classes by letting $C_{14} = 0$, i.e., $$\tan \theta_o = \sqrt{\frac{C_{44}}{C_{66}} - 2} \qquad (5)$$

In this case the transverse tunable acousto-optic filter is realizable only if $C_{44} > 2C_{66}$.

As an example, consider the design of a transverse filter using TeO₂. The acoustic beam is chosen to be propagated in the (110) plane. $C_{66} = 2.25 \times 10^9$ N/m² and $C_{44} = 2.65 \times 10^{10}$ N/m². From Eq. (5), $\theta_o$ is found to be about 72.3°.

While what has been described above are the presently most preferred embodiments, it should be understood that the invention can take many other forms. For example, the light diffracting structure described could be used in other applications, for example, as a modulator, in addition to being used as a filter. Because many additions, modifications and alternations can be made without departing from the present invention, it should be understood that the invention should be limited only insofar as required by the scope of the following claims.

I claim:

1. Apparatus for diffracting light from a first polarization to a second polarization, said apparatus comprising an acoustically anisotropic, optically birefringent crystal, means for exciting an acoustic wave in the said crystal, means for passing a light beam through the said crystal along a selected axis oriented at a non-zero angle with the optic axis of said crystal, and means for directing the acoustic wave and light in said crystal such that the group velocity of the acoustic wave is substantially perpendicular to the said axis of said light beam in said crystal, said axis of said light beam being selected such that the tangents to the locus of the wavevectors for the incident light and diffracted light are substantially parallel.

2. An apparatus as in claim 1 wherein said crystal comprises crystal quartz and said selected axis of said light beam lies in the (100) plane and inclines at approximately 37.9° with the optic axis.

3. An apparatus as in claim 1 wherein said crystal comprises telluride oxide (TeO₂) and said selected axis of said light beam lies in the (110) plane and inclines at approximately 72.3° from the optic axis.

4. An apparatus as in claim 1 wherein the said crystal comprises Tl₃AsSe₃ and said selected axis of said light beam lies in the (100) plane and inclines at approximately 15° from the optic axis.

5. The apparatus of claim 1 wherein said apparatus comprises an electronically tuned optical filter.

* * * * *